F. H. TAPPENDORFF.
SAW SWAGE.
APPLICATION FILED MAR. 1, 1910. RENEWED FEB. 15, 1911.
1,008,621.
Patented Nov. 14, 1911.
2 SHEETS—SHEET 1.
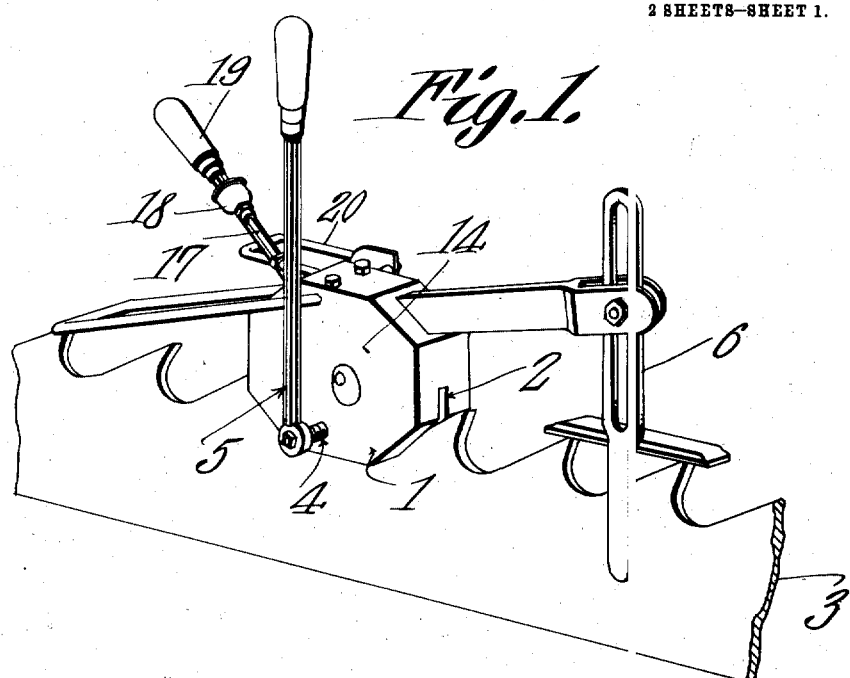
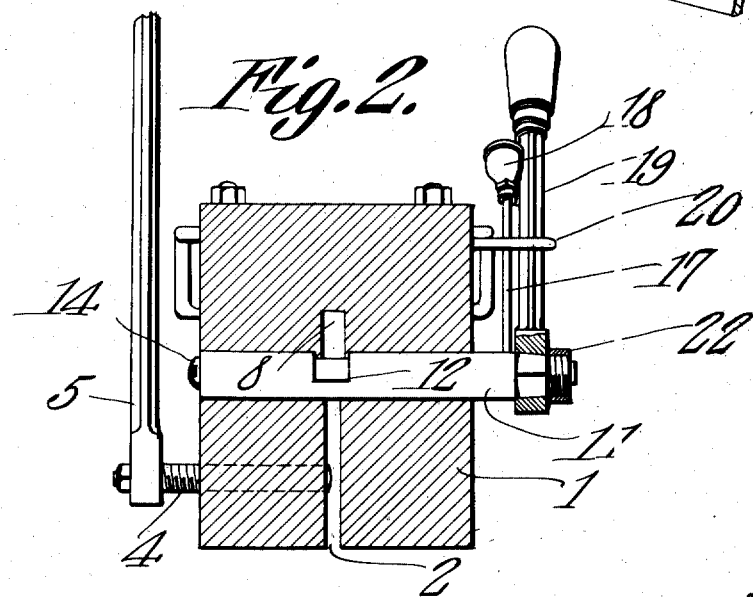
Witnesses
Inventor
Fred H. Tappendorff.
By C. A. Snow & Co.
Attorneys

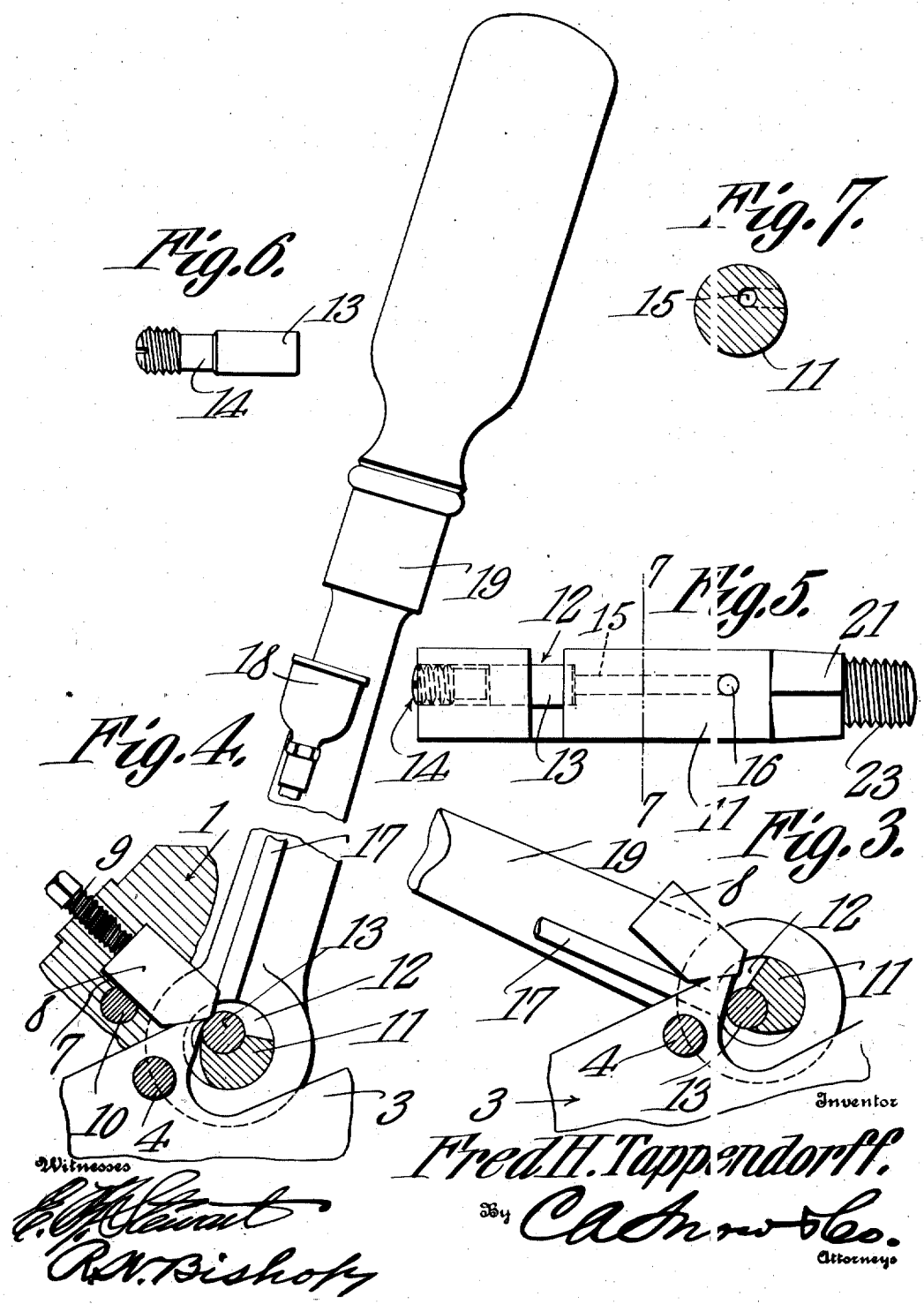

UNITED STATES PATENT OFFICE.

FRED H. TAPPENDORFF, OF EUREKA, CALIFORNIA.

SAW-SWAGE.

1,008,621.     Specification of Letters Patent.     Patented Nov. 14, 1911.

Application filed March 1, 1910, Serial No. 546,645. Renewed February 15, 1911. Serial No. 608,773.

*To all whom it may concern:*

Be it known that I, FRED H. TAPPENDORFF, a citizen of the United States, residing at Eureka, in the county of Humboldt and State of California, have invented a new and useful Saw-Swage, of which the following is a specification.

This invention relates to saw swages and has for its object the provision of a simple and efficient device by which the saw teeth may be readily expanded to the proper shape without crystallizing the metal. This object is attained in the device illustrated in the accompanying drawings, and the invention consists in certain novel features of the same which will be hereinafter first fully described and then particularly pointed out in the appended claim.

In the drawings,—Figure 1 is a perspective view of a saw swage embodying my invention in operative position upon a portion of a saw blade. Fig. 2 is a transverse section of the swage. Fig. 3 is a detail longitudinal section with the body or block omitted and showing the operative parts in their initial positions. Fig. 4 is a similar view showing the parts in the position assumed after the tooth has been swaged. Fig. 5 is a detail elevation of the swaging shank or shaft. Fig. 6 is a detail elevation of the swaging roller and the screw plug by which the same is held in position, and Fig. 7 is a detail sectional view on the line 7—7 of Fig. 5.

In carrying out my invention, I employ a body or block 1 which is provided with a longitudinal slit 2 in its under side to admit the saw blade 3 and is clamped in position upon the saw blade by means of a screw 4 mounted transversely in one side and operated by means of a lever or handle 5, as will be readily understood. The usual bracket 6 projects from one end of the body or block 1 so as to gage the position of the body relative to the saw teeth and within the body is formed a chamber 7 within which is placed an anvil 8 adapted to rest upon the upper edge of a saw tooth and adjustably held within the said recess against the saw tooth by a set screw 9 mounted in the upper portion of the body and bearing upon the upper end of the anvil, as clearly shown in Fig. 4. The anvil is clamped against the front wall of the chamber 7 by a transverse wedge or pin 10 inserted through the body and bearing against the rear side of the anvil so that the anvil will be rigidly secured within the body and held against yielding when pressure is applied to the saw tooth in the operation of the device. The swaging shank or shaft 11 is mounted transversely in the body 1 in advance of and below the chamber 7 and is provided with an annular notch or groove 12 adapted to receive the tooth of the saw, while in the said shank or shaft is eccentrically disposed a bore wherein is mounted a swaging roller 13 which extends across the notch or groove 12 and is prevented from slipping from the eccentric bore of the shank by a screw plug 14 fitted into the outer end of the bore, as clearly shown in Fig. 5. The shank is provided with a longitudinal oil duct 15 which extends from the bore in which the swaging roller 13 is mounted to a transverse oil duct or opening 16 in which is fitted the lower end of an oil tube 17 leading from an oil cup 18 which is carried by the operating lever or handle 19 by means of which the swage shank or shaft is manipulated, the movements of this lever or handle 19 being limited by a loop 20 projecting from the side of the body 1. The handle is provided with a tapered eye adapted to fit upon the conical or tapered portion 21 of the shank and secured thereon by a nut 22 fitted upon the threaded extremity 23 of the shank, as will be readily understood.

The device is fitted upon the saw blade in the position shown in Fig. 1 with the operating lever or handle 19 in its rearmost position and the anvil bearing upon the back of the saw tooth at the point of the same, as clearly shown in Figs. 3 and 4. The swaging roller 13 will bear against the face of the tooth below the point thereof, as shown in Fig. 3. The lever or handle 5 being swung forward, the screw 4 will be forced inward so as to clamp the saw blade within the slit 2 of the body and the lever or handle 19 is then swung forward to the position shown in Fig 4. The forward movement of this lever 19 will cause the roller 13 to ride upward under the saw tooth and as the roller is eccentrically mounted in the shank or shaft 11 the roller will in its upward movement bear upon the face of the saw tooth and will roll the metal of the tooth so as to expand the tooth laterally. The levers 5 and 19 being returned to their former position the swage may be readily moved to the next tooth of the saw and the operation repeated until the desired shape has been given all the teeth. It will be readily seen that my device is composed of few parts which are simple in construction and may be easily operated. The rolling action of the swage roller 13 in my device will impart the proper shape to the tooth and does not harden or crystallize the metal so that the metal does not become brittle and will not crumble during the gumming operation or break off when the saw is in use. The device is automatically supplied with lubricant so that the wear upon the parts is reduced to a minimum without any waste of the lubricant or soiling of the clothes or hands of the operator.

Having thus described my invention, what I claim is:

In a saw swage, the combination with a body having a slit for the saw blade, means for holding the latter therein, an anvil, means for setting the anvil, and a shank journaled through the body and having an annular groove registering with said slit, a longitudinal eccentric bore extending across the groove and threaded at its outer end, and a longitudinal oil duct leading from the inner end of said bore and opening laterally out of the shank; of a swaging roller seated in said bore, a screw plug in the threaded end thereof against said roller, an oil tube communicating with the outer end of said duct and extending radially from the shank, an oil cup at the upper end of the tube, and an operating handle connected with said shank and attached to said cup.

In testimony that I claim the foregoing as my own, I have hereto affixed my signature in the presence of two witnesses.

FRED H. TAPPENDORFF.

Witnesses:
GEO. F. HILL,
J. W. CALKINS.

Copies of this patent may be obtained for five cents each, by addressing the "Commissioner of Patents, Washington, D. C."